Figure 1:
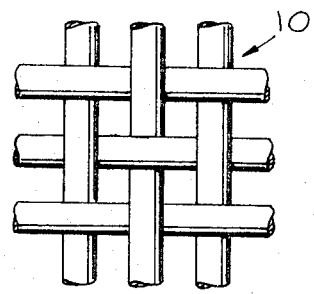

June 10, 1969 R. CHAND 3,449,162

METHOD OF MAKING OXYGEN MEASURING CELLS

Filed Sept. 17, 1965

INVENTOR.
RAMESH CHAND
BY Samuel Lindenberg
ATTORNEY

United States Patent Office 3,449,162
Patented June 10, 1969

3,449,162
METHOD OF MAKING OXYGEN
MEASURING CELLS
Ramesh Chand, Los Angeles, Calif., assignor to Analytic Systems Company, Pasadena, Calif., a corporation of California
Filed Sept. 17, 1965, Ser. No. 487,972
Int. Cl. H01j 1/00; B44d 1/18; B01k 3/06
U.S. Cl. 117—210                 10 Claims This invention relates to apparatus for detecting and measuring the concentration of a specified gas, such as oxygen, in the presence of other gases and more particularly to improvements therein.

One of the analyzers for determining the presence and amount of a specific gas in the presence of other gases, which is currently in use, constitutes an electroylic cell wherein an electrode that is in contact with an electrolyte is exposed to the gas mixture which is to be analyzed. In response to such exposure, current is generated by the cell which indicates the amount or concentration of a gas component, for example, oxygen, that is present in the gas mixture and to which the cell is sensitive. Devices of this type are illustrated for example in Patent No. 2,805,-191 issued to Hersch, Patent No. 2,992,170, issued to Robinson, and Patent No. 3,103,481, also issued to Robinson. In the devices described in these patents, current is generated by the cell in an amount that depends upon the concentration of an oxidizing gas to which the cell cathode is exposed.

In each of the devices described, the cathode may be made of metal, such as silver. In the devices described in the Robinson patents, the cathodes are preferably in the form of a mesh which is constructed so that while the cathode may be only partially inserted into the electrolyte, the entire cathode is maintained wet by a film of the electrolyte due to capillary action. It has been found that for best operation, a film of the electrolyte is needed over the entire surface of the cathode. As soon as the film gets too thin or as soon as dry spots appear, the electrolytic cell begins to lose sensitivity and to behave nonlinearly.

Robinson in Patent No. 3,103,481 describes various methods for treating a cathode in order to sustain a thick film of electrolyte. However, at best he obtains an electrolyte film of average thickness 0.05 mil which results in the extension of the linear range of a cell up to 1% oxygen. In one of his methods which is presently used, the entire cathode is electro-etched in a solution composed of equal parts of concentrated sulfuric acid, phosphoric acid and water. This results in a deposit of a thin layer of silver phosphate, called the passivation coating, over the cathode. While the cathode can hold a thin film of electrolyte over its entire surface, when a solution of potassium carbonate or bicarbonate is used as an electrolyte, after two or three days of use, dry spots begin to appear on the cathode. This is due to the fact that potassium carbonate and bicarbonate are less hygroscopic than potassium hydroxide. Thus, a thicker film of electrolyte than is achieved by the treatment of the cathode is necessary in order to obtain operation of the cell over an extended period of time. Furthermore, the cells which use potassium hydroxide as an electrolyte show a steady loss of their sensitivity over an extended period of time. This is possibly due to the slow dissolution of the phosphate coating on the cathode in the electrolyte, and hence a change in the surface conditions of the cathode. In addition, the cells having the previously-indicated treatment were linear only up to an oxygen concentration of 1%. This was because the thickness of the electrolyte film over the cathode was insufficient for a linear response to high concentrations of oxygen (internal resistance too high).

An object of this invention is to provide in a cell of the type described a method and means of treating the surface of the cathode to obtain a surface condition such that the film of electrolyte is held over its entire surface over an extended period of time using any one of the mentioned electrolytes or other suitable electrolytes.

Yet another object of this invention is to provide a method and means of treating the surface of a cathode, in a cell of the type described, to obtain a thicker electrolytic film over the cathode surface than heretofore obtainable.

Still another object of the present invention is to provide the method and means of treating a cathode whereby the thickness of the film of electrolyte which covers the cathode may be controlled.

Another object of this invention is to provide an improved cell, of the type described, which can detect and provide a linear response to the presence of up to 100% of oxygen.

Yet another object of the present invention is the provision of a method and means of treating the surface of a cathode made of mesh so that there is no foreign substance over the surface such as the phosphate coating which tends to act as a diffusion barrier for oxygen which reacts at the surface, and which also may be dissolved into the electrolyte thereby changing the surface characteristics of the cathode.

These and other objects of the invention may be achieved by, in one embodiment of the invention, dipping the cathode metal mesh into a solution of salt of the cathode metal and thereafter heating it in an oven until the salt decomposes to its metallic state. The salt must be soluble in a solvent (e.g. water) such that the salt can decompose to its metal state at a temperature lower than the melting point of the cathode metal. The resulting metal obtained appears in a beaded form over the surface of the cathode producing a plurality of microchannels which operate to provide a film of electrolyte over the entire surface of the cathode, when it is dipped into a solution of electrolyte, for an indefinite period of time. The beading of the surface can be varied with the concentration of the salt, into which the cathode is dipped. The greater the concentration the greater the beading and the thicker the film of electrolyte which is held to the cathode surface. The reverse is also true. This enables one to make cells which can linearly detect the presence of oxygen up to 100%, which was not heretofore possible.

Further, in accordance with this invention, where it is desired for cells to detect parts per million (p.p.m.) of the presence of oxygen, the electrolyte film must be thin enough for fast response. The cathode assembly is dipped in a solution of nitric acid which results in a film of silver nitrate over the surface of the cathode by the action of the silver with the nitric acid. The cathode assembly is thereafter heated to decompose the silver nitrate to silver. The cathode again presents the beaded appearance with a plurality of microchannels whereby the effects of capillarity to produce wetting of the entire surface over an extended period of time is produced.

Figure 2:
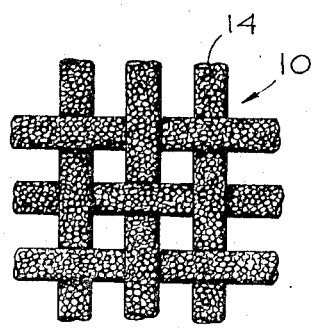

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 illustrates an enlarged section of the metal mesh used for the cathode of an oxygen detecting cell before being treated; and FIGURE 2 represents the appearance of the portion of the metal mesh shown in FIGURE 1 after being treated in accordance with this invention.

FIGURE 1 illustrates the appearance of an enlarged section of a metal mesh 10 which may be used for a cathode, for example. It is relatively smooth and can hold at most a thin film of about 0.02 mil thick of electrolyte as a result of capillary action for a short duration. FIGURE 2 represents the appearance of the same mesh after treatment in accordance with this invention. It will be seen that the surface of the metal of which the screen is composed has a plurality of tiny beads 14 which form microchannels. As a result, a film of electrolyte is much more readily drawn up and preserved over the surface, when the screen is dipped in the electrolyte, than is the case when the screen has the surface appearance shown in FIGURE 1. Also, the film which is established is thicker than is the case of the untreated screen.

In accordance with this invention, if the cathode is made of a silver metal mesh then the silver mesh screen cathode assembly is dipped in a solution of silver nitrate thereby leaving a film of silver nitrate over the surface of the cathode. The cathode is then heated in an oven at 800° C. The silver nitrate decomposes to silver at about 450° C. and the silver thus obtained appears in a beaded form over the surface as shown in FIGURE 2.

Depending upon the different concentrations of silver nitrate used, the surface is observed to have beading to a greater or lesser degree. This in turn provides different depths to the michochannels thus formed. A deeper microchannel holds a thicker film. The greater the concentration of the silver nitrate solution, the greater the beading and the thicker the film of electrolyte obtained. The less concentrated silver nitrate solution provides a less beaded surface and holds a thinner electrolyte film. By suitable treatment a cathode may hold a film as thick as 2 mils. Thus, it is now possible to provide a gas detecting cell which can linearly detect oxygen up to 100%, a feature which was not possible before.

It has also been found that an improved result is obtained if the silver mesh screen is cleaned before being dipped in the silver nitrate solution. Thus, by way of example, the silver mesh cathode assembly may first be boiled in a 20% solution of potassium hydroxide for about five minutes. This thoroughly cleanses the surface and enables the silver nitrate solution to stick better to the surface.

By way of example, in order to provide a cell which can measure the concentration of oxygen ranging from zero to 25%, the cathode assembly is dipped for at least one-half minute in a 50% silver nitrate solution (by weight). The assembly is thereafter heated in an oven at a temperature of 800° C. for about fifteen minutes.

Where it is desired for these cells to detect p.p.m. of oxygen where the electrolyte film must be thin enough for fast response, the following method of treatment of the cathode assembly for obtaining beading may be used. The cathode assembly is dipped in to a solution of nitric acid. This results in a film of silver nitrate being formed over the surface of the cathode by the action of the silver with the nitric acid. By varying the time, a given cathode assembly is dipped in the solution of nitric acid, different concentrations of silver nitrate are obtained on the surface of the cathode and different resulting electrolyte film thicknesses are obtained over the cathode. For example, in order to obtain a linear and rapid response to the presence of oxygen from zero to 10 p.p.m., a cathode assembly is dipped into a 20% solution of nitric acid by volume. The time of the dip was four minuates. The cathode assembly is then heated in an oven at 800° C. to decompose the silver nitrate to silver.

This invention should not be considered as limited to silver and silver nitrate. Should a gold electrode be desired for similar applications, the cathode is dipped in to a solution of gold chloride ($AuCl_3$) and heated in the oven at 500° C. The gold chloride decomposes to gold at about 260° C. leaving the beaded microchannels. The concentration of gold chloride of course may be varied at will, depending upon the thickness of electrolyte film desired. Should a platinum electrode be sought, a similar treatment with platinum chloride ($PtCl_4$) is used. The decomposition temperature used in the oven is 370° C. Accordingly, in accordance with this invention, the cathode is dipped in to a solution of the salt of the cathode metal. The salt should be such that it is very soluble in a solvent (e.g. water) and decomposes to its metallic state at a temperature lower than the melting point of the cathode metal, leaving a beaded appearance on the surface. The cathode after such dipping is heated in an oven at the temperature at which the salt decomposes to its beaded state.

There has accordingly been described and shown hereinabove a novel and useful treatment for treating the surface of the electrode assembly of a gas analyzing cell. It was found that using the treatment indicated, the performance of the cells was independent of the type of electrolyte used. The cells improved markedly in their stability. They showed to change in their output when tested for a period of one month, operating continuously on a fixed concentration of oxygen. Untreated cells showed an average drive of 5% of full scale per day. The cells had a much better response and recovery time. For example, the cells treated with the nitric acid provided a 90% response time in less than two minutes as compared to more than three and one-half minutes for untreated cells. Finally, in accordance with this invention, the capability of the cells are extended to linearly measure up to the presence of 100% oxygen.

What is claimed is:

1. A method of treating a metal electrode of an electrolytic cell comprising forming a film of a salt of said metal on the surface of said metal electrode, said salt having the property that it can be decomposed to its metallic sate at a temperature lower than the melting point of the surface of said metal electrode, and heating said dipped metal electrode at a temperature above said decomposition temperature but below said melting temperature to form a beaded metal layer on said meal electrode surface.

2. A method of treating a metal electrode as recited in claim 1 wherein said metal is silver, and a film of silver nitrate is formed on said silver electrode by dipping said electrode in a solution of silver nitrate.

3. A method of treating a metal electrode a recited in claim 1 wherein metal is silver, and a film of gold chloride is formed on said gold electrode by dipping said electrode in a solution of gold chloride.

4. A method of treating a metal electrode as recited in claim 1 wherein said metal is platinum, and a film of platinum chloride is formed on said platinum electrode by dipping said electrode in a solution of platinum chloride.

5. A method of treating a cathode of a gas analyzing cell, which cathode is made of silver comprising dipping said cathode in a solution to form a layer of solution containing a thermally decomposable salt of silver on the surface of said cathode, and heating said layer coated cathode assembly at at temperature on the order of 800° C. to decompose the surface layer film leaving silver on said surface in a beaded form.

6. The method as recited in claim 5 wherein said solution is selected from the group consisting of a solution of silver nitrate and a solution of nitric acid.

7. The method of treating a silver mesh cathode of a gas detecting cell for improving the operation thereof comprising the steps of dipping said cathode for a predetermined interval of time into a predetermined concentration of a solution selected from the group consisting of silver nitrate and nitric acid to form a film of silver nitrate on said cathode, and heating said cathode in an oven at a temperature of 800° C. until the film on the surface of the cathode has been decomposed into silver beads.

8. The method of treating the silver mesh cathode of a gas detecting cell for improving the performance thereof comprising the step of dipping said cathode in a boiling solution of potassium hydroxide for a predetermined interval, cooling said cathode to the ambient temperature, dipping said cathode in a solution of silver nitrate for a predetermined interval, said heating said cathode in an oven at 800° C. until the solution remaining on the surface of said cathode has decomposed leaving silver in beaded form over the siurface of said cathode.

9. The method of treating a cathode of a gas detecting cell which cathode is made of a silver mesh comprising dipping said cathode in a 50% by weight solution of silver nitrate for an interval on the order of one-half minute, heating said cathode at a temperature of 800° C. until the film of solution of said cahode has been decomposed into silver in beaded form over the surface of said cathode.

10. The method of treating the cathode of a gas detecting cell which is made of silver mesh comprising dipping said cathode in a 20% by volume solution of nitric acid for an interval on the order of four minutes, and thereafter heating said cathode at a temperature on the order of 800° C. for the term required to decompose the solution to leave in beaded form over the surface of the cathode.

References Cited

UNITED STATES PATENTS

| | | | |
|---|---|---|---|
| 2,065,570 | 12/1936 | Essig | 117—210 |
| 2,171,213 | 8/1939 | Jones | 117—210 |
| 2,661,304 | 12/1953 | Sommer | 117—210 |

FOREIGN PATENTS 560,138   9/1932   Germany.

WILLIAM L. JARVIS, *Primary Examiner.*

U.S. Cl. X.R.

117—130, 212, 227; 204—190, 195, 290, 292